3,027,232
MANUFACTURE OF SPHEROIDAL ALUMINA PARTICLES FROM ALUMINUM SULFATE

Edward Michalko, Chicago, Ill., assignor to Universal Oil Products Company, Des Plaines, Ill., a corporation of Delaware
No Drawing. Filed Aug. 13, 1959, Ser. No. 833,404
1 Claim. (Cl. 23—143)

The present invention relates, in its most broad scope, to the manufacture of spherical alumina particles, and is more particularly directed to a method for manufacturing spherical alumina particles which utilizes aluminum sulfate as the sole source of the aluminum. Specifically, the method of the present invention comprises a combination of manufacturing procedures designed to permit the use of aluminum sulfate, which had not heretofore been possible, in producing suitable spherical alumina particles.

Alumina, in its many anhydrous forms, as aluminum oxide hydrate, or aluminum hydroxide, is used extensively in chemical and petroleum industries. Alumina is employed as a catalyst in and of itself, and quite often serves as a carrier material for catalytically active metallic and non-metallic components. In addition, alumina is often used as a dehydrating, treating or purifying agent. Various physical modifications of alumina result in a form commonly referred to as "activated alumina," having an especially desired type of catalytic activity, as well as a high degree of adsorptive capacity. Alumina is very stable up to temperatures of about 1800° F. or more and, in view of this physical property, finds widespread use as a special type of refractory material. For many other uses, alumina is often combined with other inorganic refractory oxides such as silica, magnesia, thoria, titania, boron oxide, zirconia, etc. and mixtures of the same, all of which possess certain desired physical characteristics. Whatever its intended use, however, it is necessary that the alumina be substantially pure and especially free from contaminants which, if present, might induce adverse effects toward any of the functions previously described.

One of the first commercial methods for alumina production was the recovery of aluminum oxide from naturally occurring clays and earths. This method involved a long, arduous process while producing a low-grade, relatively expensive alumina. Many investigations have since been conducted with respect to manufacturing processes whereby a relatively inexpensive, high-purity alumina might be produced. Precipitation methods have been studied in which a weak alkaline material, such as an aqueous solution of ammonium hydroxide, is added to an aqueous solution of an aluminum salt to form a precipitate of alumina. However, due to certain physical characteristics imparted to the resulting alumina, which inherently result from the use of ammonium hydroxide in the reaction, the precipitate thus formed is difficult to convert into an alumina which is suitable for any of the functions previously described. As a consequence, other, more expensive, alkaline materials must be employed as precipitants and the precipitation methods therefore become difficult to justify economically. In addition, even though the alkaline precipitant may be suitable, not all of the salts of aluminum are advantageously employed. For example, when aluminum sulfate, which is readily obtainable at low cost, is employed, the resulting precipitate is notoriously difficult to process to its final form. Washing to remove various contaminants is extremely tedious, and, although washing by filtration is employed, relatively long periods of time are required to produce an acceptable filter cake which can easily be dried and formed into the desired shape, and/or further treated for use as a catalyst support. There is evidence that the above described difficulties are peculiar to alumina and do not arise to any great extent in the manufacture of other refractory oxides exemplified by the oxides heretofore mentioned. The difficulties encountered in attempting to produce an acceptable alumina particle from aluminum sulfate, are magnified where it is desired to produce spherical alumina particles.

The use of alumina particles in substantially spherical or spheroidal shape offers numerous advantages when the alumina is employed as an adsorbent, treating, refining, or purifying agent, or as a catalyst or component of a catalyst for the conversion of organic compounds and still more particularly for the conversion of hydrocarbons. When employed as a fixed bed in a reaction or contacting zone, the spherical-shaped particles permit a more uniform packing, thereby reducing variations in the pressure drop through said fixed bed, and in turn reducing channeling which results in a portion of the bed being bypassed. Another advantage to the utilization of spheroidal shaped alumina particles is that said alumina particles contain no sharp edges to wear or break off during processing or handling and, therefore, the tendency to plug process equipment is reduced. These particular advantages are greatly magnified when the alumina particles are employed in a moving bed, that is, when the particles are transported from one section of the process to another by either the reactants, or by an extraneous carrying medium. Thus, it is easily seen that the use of spherical or spheroidal particles permits a more effective utilization of the alumina.

The object of the present invention is to provide an economical method for producing spherical alumina particles of uniform size and shape, and which are produced by the utilization of a process which avoids arduous, expensive procedures while permitting the use of aluminum sulfate as the sole source of aluminum. The method of the present invention utilizes a combination of processing procedures including precipitation at a constantly acidic pH level, and within a limited range; neutralization of the precipitated basic aluminum sulfate, employing urea containing the enzyme urease; digestion of the neutralized precipitate with concentrated hydrochloric acid; and, the use of hexamethylene-tetramine in admixture with the alumina hydrosol from which alumina spheres are produced according to the oil-drop method.

In its most broad embodiment, the present invention relates to a method for manufacturing spherical alumina particles from aluminum sulfate which comprises simultaneously commingling an aqueous solution of aluminum sulfate with an aqueous solution of ammonium hydroxide at a constantly acidic pH, thereby forming an insoluble basic aluminum sulfate precipitate, commingling said basic aluminum sulfate precipitate with an aqueous solution of urea containing the enzyme urease, concentrating the resulting neutralized alumina slurry, digesting said alumina slurry in concentrated hydrochloric acid to produce an alumina hydrosol, commingling said alumina hydrosol with hexamethylene-tetramine, passing the resultant mixture into an oil bath in the form of droplets retaining said droplets in said oil bath until they set to hydrogel spheroids and thereafter drying and calcining said hydrogel spheroids.

In a more limited embodiment, there is provided a method for manufacturing spherical alumina particles from aluminum sulfate which comprises simultaneously commingling an aqueous solution of aluminum sulfate with an aqueous solution of ammonium hydroxide at a constantly acidic pH, thereby forming insoluble basic aluminum sulfate, commingling said basic aluminum sulfate with an aqueous solution of urea containing the enzyme urease, concentrating the resulting neutralized alumina slurry, digesting said alumina slurry at a temperature within the range of about 100° C. to about 120° C.

in concentrated hydrochloric acid in an amount to yield an aluminum to chloride weight ratio of from about 1.0:1 to about 1.3:1, commingling the resulting alumina hydrosol with hexamethylene-tetramine, passing the resulting mixture into an oil bath in the form of droplets, retaining said droplets in said oil bath until they set to hydrogel spheroids and thereafter drying and calcining said hydrogel spheroids.

In its most specific embodiment, the present invention affords a method for manufacturing spherical alumina particles from aluminum sulfate which comprises simultaneously commingling aqueous solutions of aluminum sulfate and ammonium hydroxide, maintaining the pH of the resulting mixture constantly acidic and within the range of about 5.5 to about 6.5, thereby forming an insoluble basic aluminum sulfate precipitate, commingling said basic aluminum sulfate precipitate with an aqueous solution of urea at a temperature within the range of 65° F. to about 120° F., said urea containing from about 1% to about 10% by weight of the enzyme urease and employed in an amount to yield a weight ratio of alumina equivalent, within the basic aluminum sulfate, to urea of about 1.5:1 to about 3.5:1, filtering the resulting neutralized alumina slurry, digesting the alumina filter cake in concentrated hydrochloric acid to yield an alumina hydrosol having an aluminum to chloride weight ratio of about 1.0:1 to about 1.3:1, adding hexamethylene-tetramine to said alumina hydrosol, passing the resultant mixture into an oil bath in the form of droplets, retaining said droplets in said oil bath until they set to hydrogel spheroids and thereafter drying and calcining said hydrogel spheroids.

A prior method of manufacturing alumina particles of substantially spheroidal shape was by means of a pilling operation. Recently, however, spheroidal alumina particles of uniform size and shape, and uniformity of physical characteristics, have been obtained by dispersing an alumina sol in the form of droplets into a suitable gelling medium, and immediately thereafter subjecting the resulting alumina hydrogel spheroids to specific aging treatments. It is well known that alumina hydrogel spheroids are subjected to aging treatments to impart to them certain desired physical characteristics. Generally, a complete aging treatment comprises aging in hot oil for a period of at least about 10 hours, aging in a suitable liquid alkaline medium at least about 10 hours, and finally, washing with water to reduce the concentration of alkaline medium, and to impart to the alumina spheres additional desired physical characteristics. Extensive investigations have been conducted on this method of manufacturing spherical alumina particles. These investigations have shown that alumina particles are not as readily manufactured by this method as are other inorganic oxide particles, such as, for example, silica spheres. In order to obtain acceptable spherical particles of alumina, it is necessary to employ a sol which will not set to a gel until after some time interval has elapsed. For example, when adding a conventional precipitating reagent such as ammonium hydroxide to an aluminum salt, and especially aluminum sulfate, a precipitate is formed immediately, and therefore, cannot be formed into the desired spherical shape by this method of operation because of the time required for handling. It has been found, however, that said alumina particles may be manufactured by the oil-drop method provided certain processing limitations are observed. Spherical alumina particles may be manufactured by a method which comprises commingling an alumina hydrosol with hexamethylene-tetramine, a weak base having a strong buffering action at a pH of from about 4 to about 10, and an increased rate of hydrolysis at an increased temperature without the evolution of gas, and passing the resultant mixture in the form of droplets into an oil bath maintained at elevated temperature. The droplets of alumina hydrosol are retained in said oil until said sol sets into a firm alumina hydrogel spheroid. The use of hexamethylene-tetramine produces alumina hydrogel spheroids which are uniform in size and shape, and which possess uniformity of physical characteristics. Following the aging treatment, the spheroids are subjected to drying and calcining treatments and may then be employed as catalyst carrier material, etc.

A variety of methods are currently employed in preparing the alumina hydrosol for use in the above described oil-drop method of sphere formation. Perhaps the most common is that method which consists essentially of digesting an excessive quantity of substantially pure metallic aluminum with an aqueous solution of hydrogen chloride, subsequently adjusting the resulting hydrosol to contain the proper quantity of aluminum to attain acceptable sphere formation. In another method, a solution of aluminum chloride is electrolyzed within an electrolytic cell having a porous partition between the anode and cathode. An alumina hydrosol may also be prepared by a digestion procedure similar to that hereinabove described: in this method, pure metallic aluminum is added to an aqueous solution of aluminum chloride, and the resulting mixture is subjected to digestion at its boiling point. These methods have several aspects in common: all employ either aluminum chloride, or substantially pure metallic aluminum, or a combination of these, for the purpose of producing an aluminum chloride hydrosol; and, none of the methods make use of aluminum sulfate, it having been thought impractical, if not impossible, to effect the formation of suitably firm alumina hydrogel spheroids therefrom. I have found, however, that aluminum sulfate can be employed as the sole surce of aluminum, in the manufacture of spherical alumina particles, providing certain processing procedures are employed in a particular combination. Aluminum sulfate is one of the more abundant compounds of aluminum, and, therefore, the present invention has the distinct economical advantage afforded through its use, as opposed, for example, to the use of pure metallic aluminum. The aluminum sulfate employed in the method of the present invention may be obtained from any suitable source, and may be naturally occurring, or synthetically prepared. At the present time, a large source of aluminum sulfate is available as a by-product from many of the processes designed to remove and recover the catalytically active metallic components from catalysts employing alumina as the carrier material. The processes, in general, employ sulfuric acid for the purpose of dissolving the alumina, leaving the metallic components in a finely divided state, and producing thereby the aluminum sulfate. It is not intended, however, to limit the present invention to this particular source of aluminum sulfate.

The first distinct step in the combination of procedures, which I employ to produce spherical alumina from aluminum sulfate by the oil-drop method, consists of reducing the sulfate ion concentration of the solution through the precipitation of an insoluble basic aluminum sulfate therefrom. This precipitation is effected at a constantly acidic pH level, and preferably within the range of about 5.5 to about 6.5. Conventional methods for precipitating alumina involve the procedure of adding a solution of one compound to a vessel containing a large supply of the other compound. For example, in this manner, a solution of ammonium hydroxide is added to a vessel which contains a large amount of an aqueous solution of an aluminum salt thereby precipitating alumina. However, the pH during this preciptiation method either starts at a low level and increases, or starts at a high level and slowly decreases. The alumina so produced has an extremely low solids content and is very difficult to wash because of its inherently poor filtration characteristics. These poor characteristics, and the low solids content, are more evident when ammonium hydroxide is employed as the alkaline material to precipitate alumina from a solution of aluminum sulfate. When the pH of the mixture is maintained at a constant level substantially throughout the period of mixing, as well as during the ensuing formation of aluminum hydroxide and precipitation of alumina, a dense, granular precipitate is obtained which has a relatively high solids content, is readily filtered because of the more granular character of the alumina precipitate, and may also be readily washed for the removal of various contaminants. Although the resulting alumina precipitate may be washed by any suitable procedure, a particularly preferred method comprises filtering the precipitate from its aqueous suspension and continuing the suction on the underside of the filter cake as the washing solution is added to the top of the filter cake. This method tends to decrease the quantity of alumina which is inherently lost and subsequently unrecovered through the use of other methods. In addition, filtering produces the alumina in a form which is easily handled and which is readily adaptable for further processing.

It is preferred to employ aqueous solutions of the ammonium hydroxide and aluminum sulfate to precipitate the insoluble basic aluminum sulfate, and any suitable concentrations may be used. For ease in handling, metering, and applying the method of the present invention, aqueous solutions of from about 15% to about 40% by weight are preferred, although other concentrations may be advantageously used. The solutions are simultaneously added to any suitable vessel containing a mechanism for mixing and which is equipped with any suitable means for determining the pH of the resulting mixture, and controlling the pH by adjusting the rates of addition of either and/or both the solutions of ammonium hydroxide and aluminum sulfate. A sufficiently small amount of aluminum sulfate is added to a small amount of water to bring the initial contents of the vessel to the desired pH level of 6.0. The solutions of ammonium hydroxide and aluminum sulfate are then simultaneously added, and the rates of either or both are continuously adjusted to maintain the pH of the mixture at the level of the initial contents of the vessel. When the desired quantity of basic aluminum sulfate has been precipitated, the addition of both the ammonium hydroxide and the aluminum sulfate is stopped.

The insoluble basic aluminum sulfate, produced by the constantly acidic pH precipitation, is commingled with an aqueous solution of urea containing minor quantities of the enzyme urease. Through the decomposition of urea, into ammonia and carbon dioxide, there is effected complete neutralization of the basic aluminum sulfate to yield an alumina slurry which is very finely divided, and substantially free from contaminating sulfate ions. The decomposition of urea, essential for the complete neutralization of the basic aluminum sulfate, generally requires an elevated temperature in excess of about 200° F. At this temperature, however, the tendency exists for the resulting mixture of urea and basic aluminum sulfate to set to a solid gelatinous mass containing partially neutralized basic aluminum sulfate in non-homogeneous admixture with aluminum hydroxide. In addition to its non-homogeneity, the gelatinous mass is inherently difficult to process further in order to produce an alumina hydrosol acceptable for utilization in the formation of spherical alumina via the oil-drop method. In accordance with the procedure of my invention, the urea, which is employed in an amount to yield a weight ratio of alumina equivalent, within the basic aluminum sulfate, to urea of from about 1.5:1 to about 3.5:1, contains minor quantities of the enzyme urease. The use of urease eliminates the necessity of employing elevated temperatures to effect the decomposition of urea, thus avoiding the disadvantage incurred as a result of the formation of the solid gelatinous mass. The enzyme urease is employed in concentrations within the range of about 1% to about 10% by weight, based on the amount of urea, and catalyzes the decomposition of the urea at temperatures below that at which the gelatinous mass is formed. Temperatures not in excess of 120° F. may be employed; it is preferred, however, to effect the neutralization at lower temperatures, and within the range of about 65° F. to about 85° F. The neutralized precipitate is obtained in a finely divided form which is readily filtered to produce an alumina filter cake of high solids content, without the production of large, non-homogeneous agglomerates, and which is substantially free from sulfate ions.

The resulting filter cake is digested in concentrated hydrochloric acid to produce an aluminum chloride hydrosol in which the aluminum to chloride weight ratio is within the range of about 1.0:1 to about 1.3:1. Generally, equal volumetric portions of the aluminum chloride hydrosol, and hexamethylene-tetramine are commingled, the resulting mixture being passed into a forming tower, in the form of droplets, containing a paraffinic hydrocarbon oil having a normal boiling point in excess of about 400° F. The droplets are maintained in the hot oil (about 203° F.) until they set into firm hydrogel spheroids. Following the formation of the alumina hydrogel spheroids, they are subjected to specific aging treatments, to impart thereto certain desired physical characteristics, including an ammonia aging step, after which the spheres are thoroughly washed with water, dried at a temperature of about 210° F., and immediately calcined at a temperature within the range of about 800° F. to about 1400° F.

The term "alumina equivalent," as employed in the specification and appended claims, is understood to mean that quantity of alumina ($Al_2O_3$) which would result if all the aluminum within the basic aluminum sulfate were converted thereto.

Briefly, the particularly preferred method for effecting the preparation of a clear, homogeneous aluminum chloride hydrosol, using aluminum sulfate as the sole source of the aluminum, which alumina hydrosol is suitable for use in the oil-drop method for forming alumina spheres, consists of precipitating basic aluminum sulfate at a constantly acidic pH value within the range of 5.5 to 6.5. The simultaneous addition of aluminum sulfate and ammonium hydroxide is controlled at a pH level, of the resulting mixture, of 6.0, not being varied beyond the limits of 5.5 and 6.5. A single washing, as by filtration, is sufficient to recover the precipitated basic aluminum sulfate as a concentrate. An aqueous solution of urea (25.4 grams of urea per 100 ml.) is added to the resulting filter cake in an amount to yield a weight ratio of alumina equivalent, in the basic aluminum sulfate, to urea of about 3.5:1. This insures complete neutralization of the basic aluminum sulfate to yield a slurry of finely divided, neutralized aluminum hydroxide. In order to catalyze the decomposition of the urea, the solution thereof contains at least about 1.0% by weight of the enzyme urease; there exists no necessity of increasing the temperature, to bring about the decomposition of urea, and the formation of the gelatinous mass is very effectively eliminated. The resulting alumina slurry is filtered and washed, the filter cake being recovered substantially free from sulfate ions, and without large, non-homogeneous agglomerate particles. The alumina filter cake, containing in excess of 17.5% by weight of solid material, is digested in concentrated hydrochloric acid to form a clear, sediment-free alumina hydrosol. The hydrochloric acid is employed in an amount to yield a weight ratio of aluminum to chloride of 1.0:1.

The following example is given to further illustrate the method and utility of the present invention: it is not intended to limit the same to the quantities, conditions and/or concentrations employed. The present invention is not intended to be limited beyond the scope and spirit of the appended claims.

*Example*

50 milliliters of water were placed in a glass beaker, and about 3 milliliters of a 28% by weight solution of aluminum sulfate, having a pH of 1.5, was added thereto. The pH of the resulting solution was adjusted to a level of 6.0 through the addition of a sufficient quantity of an aqueous solution of 28% by weight of ammonium hydroxide, having a pH of 12.8. The aqueous solutions of the aluminum sulfate and the ammonium hydroxide were then added continuously and simultaneously at such rates as to maintain the pH of the resulting reaction mixture at a level of about 6.0, not permitting the same to vary beyond the limits of 5.5 and 6.5. The addition of the aluminum sulfate and ammonium hydroxide solutions was continued until a total of 2 gallons of the aluminum sulfate solution had been added. The approximate rates during the addition and subsequent comingling of the two substances were 1200 milliliters of aluminum sufate solution per hour and 400 milliliters of ammonium hydroxide solution per hour.

The resulting basic aluminum sulfate was removed from the accompanying solution through a single washing procedure by filtration; the filter cake was re-slurried to a total weight of about 7000 grams. The slurry was analyzed and found to contain 6.27% by weight of aluminum and 5.43% by weight of sulfate ions. 1116 grams of this basic aluminum sulfate was commingled with 200 milliliters of an aqueous solution of urea containing 25.4 grams per 100 milliliters. The aqueous solution of urea contained 0.50 gram of the enzyme urease. This mixture was intimately commingled for a period of about 4 hours, after which ttime the mixture was subjected to filtration on a Buchner funnel. A total of 667 grams of neutralized aluminum hydroxide was obtained in the form of a filter cake having a solids content of 19.8% by weight, calculated as $Al_2O_3$.

The alumina filter cake was digested, for a period of about 6 hours, at a temperature of about 115° C. in 177 grams of concentrated hydrochloric acid containing about 63.6 grams of chloride to yield a 1.1:1 weight ratio of aluminum to chloride. Following the digestion, in hydrochloric acid, 500 milliliters of the resulting clear (water white) hydrosol was commingled with 500 milliliters of an aqueous solution of hexamethylene-tetramine containing 296 grams of hexamethylene-tetramine per liter of solution. The alumina sol and hexamethylene-tetramine mixture was passed into a small vessel equipped with a baffle rotated by a small motor. Droplets of the aluminum chloride sol-HMT mixture were emitted from the bottom of the mixer into the top of a forming tower approximately 2 inches I.D., and 5 feet long. The forming tower was filled with a paraffinic hydrocarbon oil having an initial boiling point in excess of 400° F., and which hydrocarbon oil was maintained at a temperature of 203° F. by means of electrical heating elements. The resulting alumina hydrogel spheroids were aged in the same oil at a temperature of 203° F. for a period of about 16 hours. The partially aged spheres were then further aged in an aqueous solution of concentrated ammonium hydroxide for a period of about 24 hours at a temperature of 203° F. The completely aged alumina spheres were then thoroughly washed with water, dried at a temperature of 248° F. in moist air, and immediately calcined thereafter in the presence of air at a temperature of 1200° F.

The calcined alumina spheres were rigid, of uniform size and shape, and were exposed to the atmosphere and washed with water without incurring adverse effects. The apparent bulk density of the calcined alumina spheres was about 0.54, and 99.5% were of the size 10-mesh or larger, indicating only about 0.50% loss due to breakage.

Heretofore, it was impossible to employ aluminum sulfate as the sole source of aluminum when manufacturing acceptable alumina spherical particles by the oil-drop method. The foregoing specification and example illustrate the method of the present invention, and indicate the benefits and utility afforded through its use in the manufacture of alumina spherical particles.

I claim as my invention:

A method for manufacturing spherical alumina particles from aluminum sulfate which comprises simultaneously commingling an aqueous solution of aluminum sulfate with an aqueous solution of ammonium hydroxide, maintaining the pH of the resulting mixture acidic and within the range of from about 5.5 to about 6.5, thereby forming insoluble basic aluminum sulfate, thereafter commingling said basic aluminum sulfate, at a temperature of from about 65° F. to about 120° F., with an aqueous solution of urea, containing from about 1% to about 10% by weight of the enzyme urease, in an amount to yield a weight ratio of alumina equivalent, in the basic aluminum sulfate, to urea of from about 1.5:1 to about 3.5:1, filtering the resulting neutralized alumina slurry, digesting the alumina filter cake at a temperature of from about 100° C. to about 120° C. in concentrated hydrochloric acid in an amount to yield an aluminum to chloride weight ratio within the range of 1.0:1 to about 1.3:1, commingling the resultant hydrosol with hexamethylene-tetramine, passing the resulting mixture into an oil bath in the form of droplets, retaining said droplets in said oil bath until they set to hydrogel spheroids and thereafter calcining said hydrogel spheroids at a temperature of from about 800° F. to about 1400° F.

References Cited in the file of this patent

UNITED STATES PATENTS

| | | |
|---|---|---|
| 1,337,192 | Buchner | Apr. 20, 1920 |
| 2,666,749 | Hockstra | Jan. 19, 1954 |
| 2,798,050 | Gladrow et al. | July 2, 1957 |
| 2,865,866 | Hockstra | Dec. 23, 1958 |
| 2,867,588 | Keith et al. | Jan. 6, 1959 |
| 2,898,306 | Cramer et al. | Aug. 4, 1959 |

OTHER REFERENCES

Karrar, P.: "Organic Chemistry," 2nd ed., Elsevier Pub. Co., Inc., New York, 1946, page 218.